United States Patent [19]

Miller

[11] Patent Number: 5,064,062
[45] Date of Patent: Nov. 12, 1991

[54] CAMERA-SUPPORTING CARRYING CASE

[76] Inventor: Stephen W. Miller, 3131 Montrose Ave., La Crescenta, Calif. 91214

[21] Appl. No.: 513,234

[22] Filed: Apr. 23, 1990

[51] Int. Cl.$^5$ ............................................. B65D 85/38
[52] U.S. Cl. ................................. 206/316.2; 206/305; 353/242; 354/82
[58] Field of Search ............................ 206/316.2, 305; 224/908; 352/242; 354/81, 82, 293

[56] References Cited

U.S. PATENT DOCUMENTS

| | | | |
|---|---|---|---|
| 2,298,144 | 10/1942 | McNabb | 354/82 |
| 2,503,485 | 4/1950 | Hill | 206/316.2 |
| 2,535,152 | 12/1950 | Nelson | 206/316.2 |
| 2,771,816 | 11/1956 | Pfaff | 352/242 X |
| 2,926,573 | 3/1960 | Weiss | 206/316.2 X |
| 2,998,042 | 8/1961 | Knauf | 206/316.2 |
| 3,291,179 | 12/1966 | Lang | 206/316.2 |
| 4,424,899 | 1/1984 | Rosenberg | 206/305 |

FOREIGN PATENT DOCUMENTS

| | | | |
|---|---|---|---|
| 3005317 | 8/1981 | Fed. Rep. of Germany | 206/316.2 |
| 3143490 | 5/1983 | Fed. Rep. of Germany | 206/316.2 |

Primary Examiner—Byron P. Gehman
Attorney, Agent, or Firm—Robert Louis Finkel

[57] ABSTRACT

A camera case comprising two mating shells. A swivelable mounting device on the first shell allows a camera to be mounted to that shell for taking photographs. In their mated relationship, the shells fully enclose the camera. The shells are connected by a flexible or hinged strap, or by the swivelable camera mounting device itself, whereby the second shell can be rotated so as to serve as a stable base supporting the first shell, with the camera mounted to it for taking photographs, on any convenient generally horizontal surface.

10 Claims, 2 Drawing Sheets

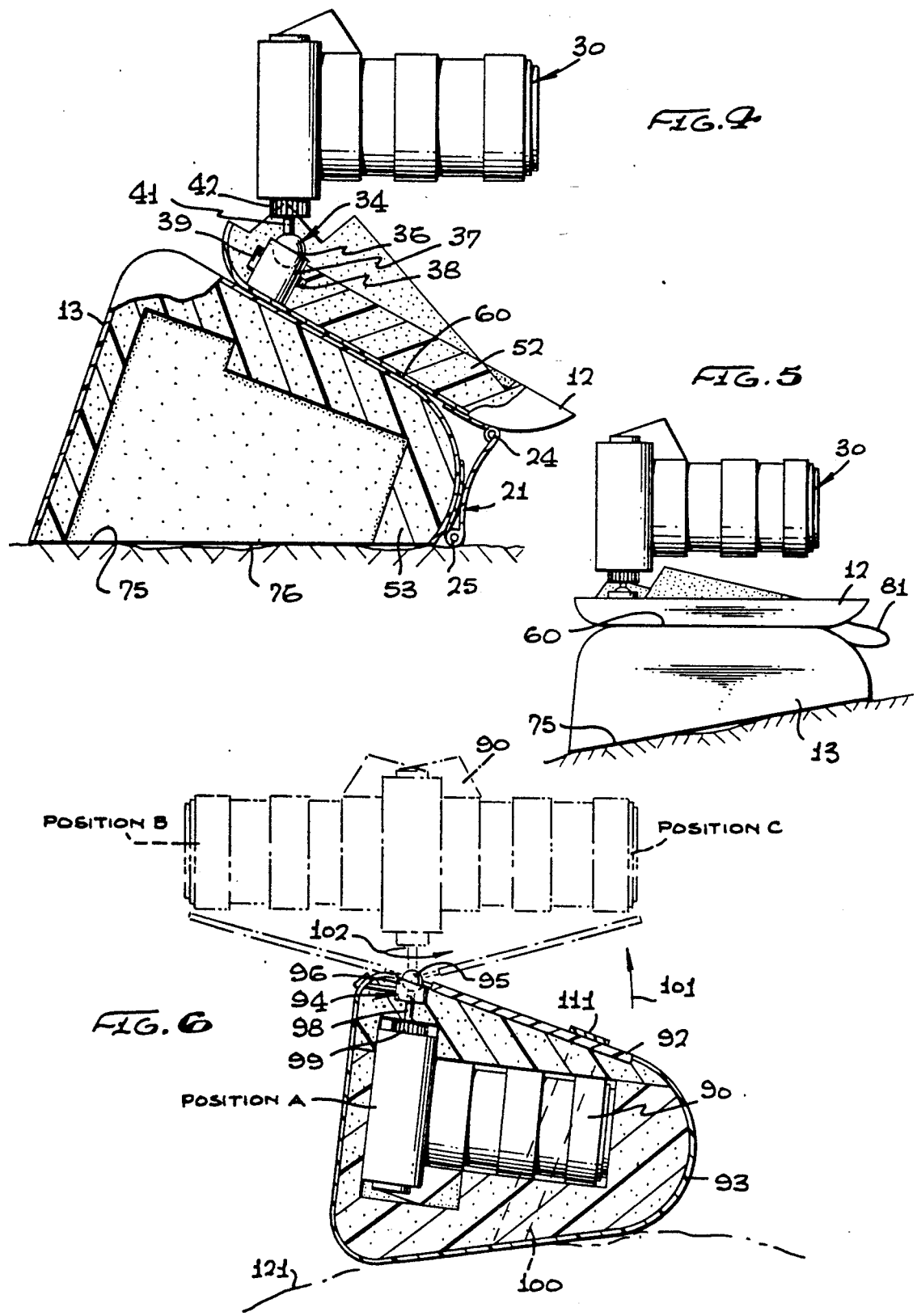

CAMERA-SUPPORTING CARRYING CASE

BACKGROUND OF THE INVENTION

1. Field of the Invention

This invention relates to camera cases, and more particularly to camera cases which are adaptable to provide freely-standing support for a camera on a surface for picture taking.

2. Prior Art

High-speed film, built-in flash apparatus, and automated electronic controls allow the modern photographer to take pictures with a hand-held camera under a wide variety of conditions. There are times, nonetheless, when a camera support is needed.

Typically, for available light photography under marginal conditions, or extremely close shooting, or any of those other unexpected situations in which the hand is simply not steady enough, the professional and the well prepared camera buff carry a tripod, attachable pistol grip, or shoulder-braced stock mount to provide the required stability. Equally typically, the amateur faced with a half-second exposure, or beseached to include himself in the family portrait and having no such equipment is reduced to searching for a strategically placed rock or piece of furniture or the like and then performing gymnastics in an effort to sight and aim the camera precariously balanced on its surface.

At least one device, the camera support shown and described in U.S. Pat. No. 4,162,696, is designed specifically for use in such situations. This device provides a pliable pouch filled with pellets as part of a deformable camera case adapted to support a camera on a surface. While the advantages of employing the case itself as a camera support are obvious, the inherent instability of the pliable pouch and its contents leaves a gread deal to be desired in terms of camera stability and adjustability.

SUMMARY OF THE INVENTION

One object of the subject invention is to take advantage of the convenience of the the camera case as a camera support, but with a construction that, unlike the aforementioned patented device, provides rigid stability for the camera.

Another object is to provide a camera supporting case that allows the camera to be readily positioned and sighted, aimed, and adjusted for picture taking on virtually any surface.

Still another object is to provide alternative designs for a camera supporting case which lend themselves to use with cameras of various constructions and configurations.

The invention achieves these objects, and others which will become apparent, by providing a more or less conventional appearing camera case formed of two substantially rigid mating shells. The camera is mounted to one of the shells. The shells, which enclose the camera when they are in mating relationship, are rotatably connected so as to allow the shell carrying the camera to be positioned and secured atop the other shell, which then serves as a freely-standing support for the camera on any convenient surface.

In two embodiments of the invention, the camera is mounted to the first shell and the two shells are connected to one another by separate means. In a third embodiment, the camera is mounted to the first shell by the same mechanism that connects the two shells. In each instance, the camera is universally rotatable about all three axes of rotation for easy sighting and aiming, without disturbing the supporting shell once it has been positioned on a supporting surface.

A carrying strap attached to the shell to which the camera is secured allows the user to sling the case from his shoulder or neck. A releasable closure secures the shells in their mated relationship, enclosing the camera, but affords ready access to the camera for hand-held operation.

For a fuller appreciation of the invention and its objects and advantages, reference is made to the following detailed description and the accompanying drawings of the three preferred embodiments in which the various novel features are more particularly set forth.

BRIEF DESCRIPTION OF THE DRAWINGS

In the drawings:

FIG. 4 is a partially cut away side elevational view of the case of FIG. 1, showing the camera supported on an irregular surface by the case;

FIG. 5 is a reduced side elevational view of a alternative embodiment of the invention; and FIG. 6 is a partially cut away side elevational view of another embodiment of the invention, showing several steps in its operation in phantom.

DESCRIPTION OF THE PREFERRED EMBODIMENTS

Figure 1:
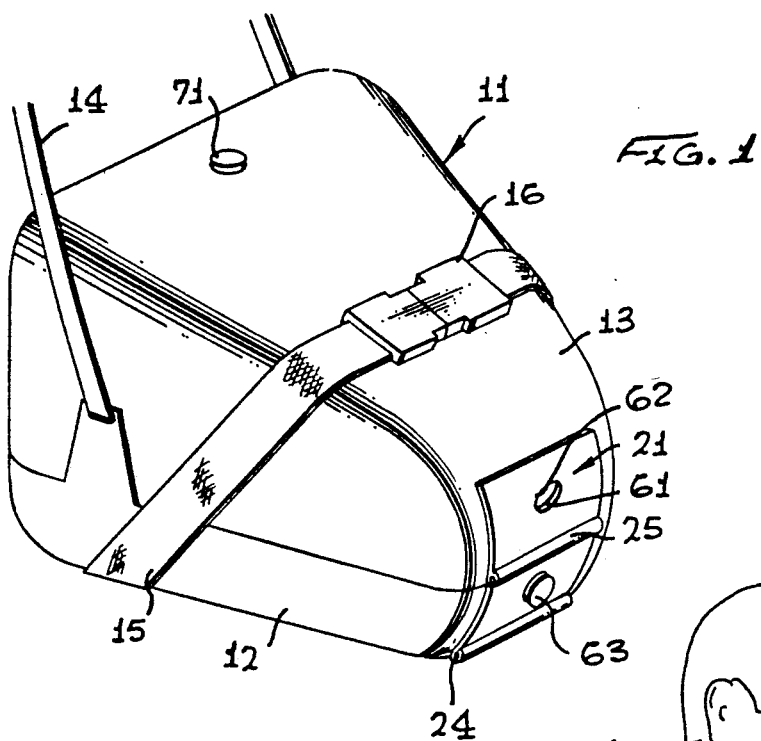
FIG. 1 is a perspective view of a camera case embodying the subject invention, showing the two shells in mating relationship enclosing a camera.

Referring to FIG. 1, a camera case 11 embodying the subject invention comprises a pair of substantially rigid shells 12, 13 designed to fit together in a mating relationship, as shown, to form a more or less conventional protective enclosure for a camera. The first shell 12 is provided with a carrying strap 14 allowing the photographer to carry the case 11 slung over the shoulder or around the neck. Closure means, such as closure strap 15 with releasable buckle 16, serve to retain the shells 12, 13 in their mating relationship, enclosing the camera. The shells 12, 13 may be of leather, metal, plastic or any other suitable material.

The shells 12, 13 are connected in a manner which permits them to be rotated with respect to one another. In the embodiment of FIG. 1, the connection is by a substantially rigid connecting strap 21 which is attached through a hinge 24 at one of its ends to the toe portion of shell 12, and through a second hinge 25 at its other end to the adjacent toe portion of shell 13.

Figure 2:
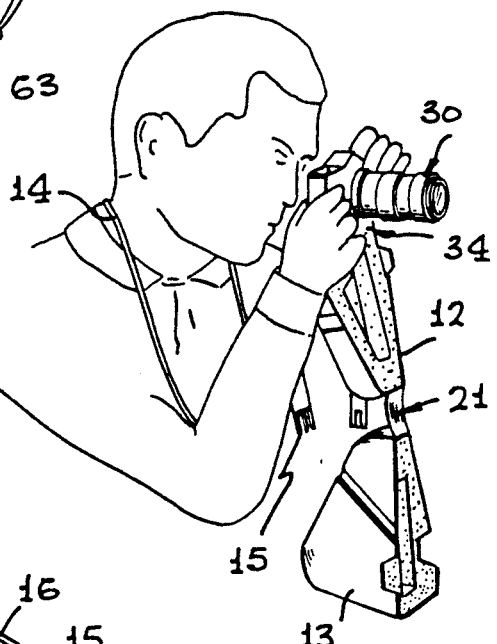
FIG. 2 is a fanciful illustration showing the case of FIG. 1 as it appears when the camera is held by hand for picture taking.

Referring to FIG. 2, a camera 30 is releasably mounted to the shell 12 by means of a gimbal mounting 34 (shown in detail in FIGS. 3 and 4), which, when loose, allows the shells 12, 13 to hang freely when the camera is held by hand for conventional picture taking.

Figure 3:
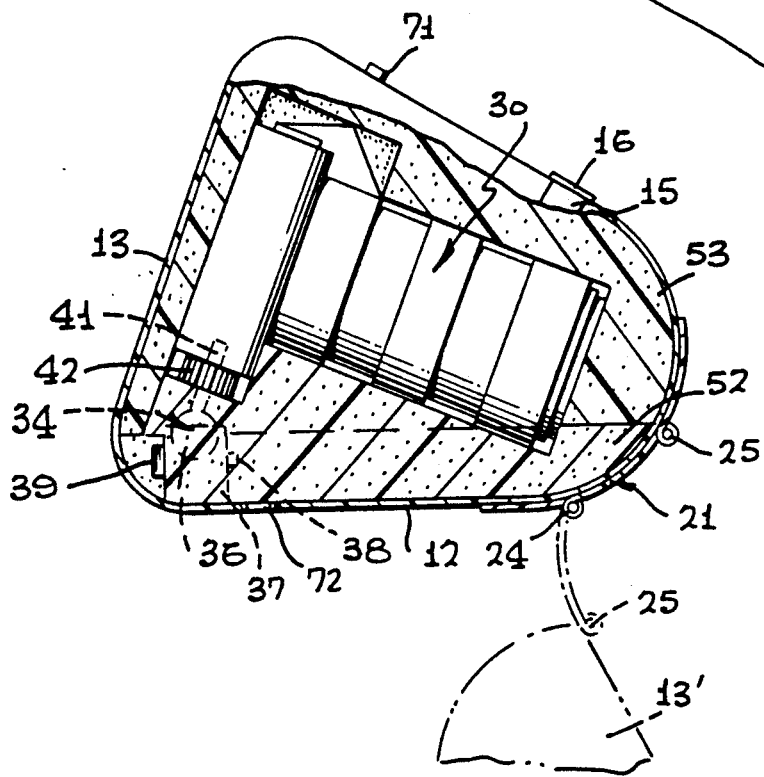
FIG. 3 is a partially cut away side elevational view of a camera case similar to the case of FIG. 1, showing an intermediate stage in the operation of this embodiment of the invention.

Referring now to FIGS. 3 and 4, gimbal mounting 34 typically includes a ball 36 rotatably retained in a split socket 37 rigidly fastened to the inside of shell 12. Conventional clamping means, such as screw 38 having a manually operated lever 39, permits the user to lock the ball in any desired position. A threaded shank 41 on ball 36 is adapted to engage the standard mounting socket found in virtually all modern cameras. A locknut 42 threaded to shank 41 serves to secure the camera 30 to the shank 41, and thus to shell 12.

Preferably, the shells 12, 13 are provided with liners 52, 53 of resilient elastomeric material, or the like, formed to conform closely to camera 30 and cushion it against shock when the shells 12, 13 are in their mating relationship as illustrated in FIGS. 1 and 3.

Opening buckle 16 releases strap 15 and allows shell 13, connected to shell 12 by strap 21, to rotate, something like a double-jointed clamshell, around hinges 24, 25 and strap 21. The relationship of shell 13 with respect to shell 12 during such rotation is illustrated in phantom by the numeral 13' in FIG. 3.. If the gimbal clamping lever 39 is turned so as to release ball 36 for free rotation in socket 37, the camera 30 may be operated in the conventional manner. The shells 12, 13 then assume the position depicted in FIG. 2 and described earlier.

To utilize the case 11 for its intended purpose, as a freely-standing support for the camera 30, shell 13 is rotated to the position shown in FIG. 4. In this position, the entire weight of camera 30 and shell 12 is resting on the upper surface 60 of shell 13.

It will be noted that in the embodiments of FIGS. 1 and 3 and 4, the combined effect of the friction between the adjacent surfaces of shells 12 and 13 and the geometry of the rigid strap 21 is to resist slippage between the shells. Nonetheless, I find it advantageous to provide positive fastening means for securing shell 12 in place atop shell 13. Two such means are shown. In the embodiment of FIG. 1, a retainer, such as a split ring 61 (not shown in detail) contained in a recess 62 in the toe of shell 12 is adapted for releasable retention of a boss 63 formed on connecting strap 21. In the embodiment of FIGS. 3 and 4, a similar boss 71 and retainer 72 are located in registry on the top of shell 13 and the bottom of shell 12, respectively. It will be understood that other releasable detent means well known in the art may be used to accomplish the same purpose.

As shown in FIG. 4, with shell 12 resting on it, shell 13 may be placed on any convenient surface 75 to provide freely-standing support for camera 30.

If desired, various conventional means may be employed to insure a stable, secure footing for shell 13 on a variety of surfaces. By way of example, a continuous strip or conveniently located pads of resilient material (not shown) may be applied to the lip 76, or one or more adjustable legs may be provided on the inner wall of shell 13 and adapted to extend downwardly of the lower edge of the wall to compensate for irregularities in the surface.

A notable advantage of the subject invention resides in the fact that once shell 13 is positioned, the gimbal mounting with its clamping mechanism affords the user complete freedom to adjust and sight the camera without fear of disturbing its support.

To enclose the camera 30 in case 11 again, the previously described steps are reversed: Gimbal mounting 34 is released to permit camera 30 to be returned to its stowed position on shell 12 as shown in FIG. 3. Gentle force then releases the fastenining means (e.g., boss 63 or 71 and retainer 61 or 72) holding the shells 12, 13 together, allowing shell 13 to be rotated into mating relationship with shell 12. Attaching the ends of closure strap 15 by means of buckle 16 insures that the case 11 will remain tightly closed until the next time the camera 30 is needed.

FIG. 5 illustrates a camera case similar to the cases shown in FIGS. 3 and 4, save for the means employed for connecting the shells 12,13. In this embodiment, a flexible strap 81 of suitable material, such as leather, fabric webbing, or one of the many well known plastics, takes the place of the hinged rigid strap 21 of the previously described embodiments.

While not critical to the invention, it is preferable in the selection of the material, dimensions, shape, and points of attachment to shells 12, 13 of strap 81 to seek to minimize the possibility of twisting. That is, the strap 81 should be designed to afford shells 12 and 13 a single degree of rotation with respect to one another. In all other respects, the construction and operation of the embodiment of FIG. 5 are substantially identical with those of the previously described cases.

In the embodiment of FIG. 6, the means for mounting the camera 90 to its associated shell 92 is an extension of the means for connecting shell 92 with shell 93. Here, a gimbal mounting 94 similar to the mounting 34 shown in FIGS. 3, 4, serves both functions. Shell 92 is rigidly attached to a ball 95. Ball 95 is contained in a split socked 96 mounted to shell 93 in a conventional manner. Camera 90 is mounted to shell 92 by means of threaded shank 98 and locknut 99. In their mating relationship denoted "Position A", shells 92 and 93 define a protective case enclosing the camera 90. A strap 100 retains shells 92, 93 in this relationship.

Alternatively, the clamping mechanism of socket 96, operated by lever 110, may be adapted for retaining shells 92, 93 in their mating relationship.

In the former instance, releasing buckle 111 on strap 100, or in the latter, releasing the ball 95, allows shell 92 and camera 90 to be rotated with respect to shell 93. The shell and camera are first rotated in the direction indicated by arrow 101 about an axis normal to the plane of the drawing to the position denoted "Position B". Then they are rotated in the direction indicated by arrow 102 about an axis lying in the plane of the drawing perpendicular to the first axis to the position atop shell 93 denoted "Position C". In this position, the entire weight of camera 90 and shell 92 is freely supported by shell 93.

As with the previously described embodiments, shell 93 may be adapted, using suitable conventional means, for supporting camera 90 on any convenient surface 121. Gimbal mounting 94 allows the camera 90 to be readily adjusted, sighted, and when aimed, rigidly secured in place for freely-standing picture taking. Reversing the procedure permits the photographer to hold the camera by hand for conventional picture taking, or to return the shells 92, 93 to their mating relationship enclosing the camera 90 as a protective case.

While I have described the invention in terms of several preferred embodiments, it is not to be construed as limited to those embodiments. The features I have depicted are illustrative rather than restrictive. It is my intention by this specification to cover any and all variations of the examples I have chosen for purposes of the disclosure, which do not depart from the spirit and scope of the following claims.

I claim:

1. A camera case adaptable for stably supporting a camera on a generally horizontal surface for taking photographs, said case comprising:
   a substantially rigid first shell;

a substantially rigid second shell adapted for mating to said first shell, said first and second shells when in mated relationship defining a protective enclosure for a camera, said second shell being further adapted to provide a stable freestanding upright base when placed on a generally horizontal surface;

connecting means for connecting said first and second shells, said connecting means allowing relative rotation of said shells between said mated relationship and a camera supporting relationship wherein said first shell is mounted to, and supported by said second shell;

camera mounting means for mounting a camera to said first shell, said camera mounting means being adjustable to position a said camera selectively for taking photographs and for containment within the enclosure defined by said shells when said shells are in said mated relationship, said camera mounting means including gimbal means affording a said camera mounted thereon freedom of rotation in at least two directions;

a carrying strap attached to said first shell for supporting said camera case; and releasable closure means for retaining said first and second shells in said mated relationship.

2. A camera case in accordance with claim 1, wherein said connecting means include said gimbal means.

3. A camera case in accordance with claim 2, wherein said camera mounting means are rigidly attached to said first shell and said gimbal means mount said first shell to said second shell for rotation in at least two directions.

4. A camera case in accordance with claim 3, wherein said restraining means comprises clamping means for releasably immobilizing said gimbal means.

5. A camera case in accordance with claim 1, wherein said connecting means includes a connecting strap attached at its ends to said first and second shells.

6. A camera case in accordance with claim 5, wherein said connecting strap is flexible.

7. A camera case in accordance with claim 5, wherein said connecting strap is substantially rigid and is hingedly attached at its ends to said first and second shells.

8. A camera case in accordance with claim 1, wherein said gimbal means comprise a ball and socket.

9. A camera case adaptable for stably supporting a camera on a generally horizontal surface for taking photographs, said case comprising:

a substantially rigid first shell;

a substantially rigid second shell adapted for mating to said first shell, said first and second shells when in mated relationship defining a protective enclosure for a camera, said second shell being further adapted to provide a stable freestanding base when placed on a generally horizontal surface;

gimbal means for connecting said first and second shells, said gimbal means allowing relative rotation of said shells in at least two directions and between said mated relationship and a camera supporting relationship wherein said first shell is mounted to, and supported by said second shell;

releasable camera mounting means for rigidly mounting a camera to said first shell for taking photographs and for containment within the enclosure defined by said shells when said shells are in said mated relationship;

releasable clamping means for immobilizing said gimbal means and thereby rigidly retaining said first and second shells in any desired relationship;

a carrying strap attached to said first shell for supporting said camera case; and releasable closure means for retaining said first and second shells in said mated relationship.

10. A camera case in accordance with claim 9, wherein said camera mounting means are rigidly attached to said gimbal means.

* * * * *